United States Patent
Liu et al.

(10) Patent No.: US 9,280,517 B2
(45) Date of Patent: Mar. 8, 2016

(54) SYSTEM AND METHOD FOR FAILURE DETECTION FOR ARTIFICIAL LIFT SYSTEMS

(75) Inventors: Shuping Liu, Los Angeles, CA (US); Cauligi Srinivasa Raghavendra, Los Angeles, CA (US); Yintao Liu, Los Angeles, CA (US); Ke-Thia Yao, Los Angeles, CA (US); Oluwafemi Opeyemi Balogun, Rosenberg, TX (US); Olanrewaju Olabinjo, Sugar Land, TX (US); Dinesh Babu Chinnapparaja Gunasekaran, Los Angeles, CA (US)

(73) Assignee: UNIVERSITY OF SOUTHERN CALIFORNIA CA (US)

( * ) Notice: Subject to any disclaimer, the term of this patent is extended or adjusted under 35 U.S.C. 154(b) by 533 days.

(21) Appl. No.: 13/531,127

(22) Filed: Jun. 22, 2012

(65) Prior Publication Data
US 2013/0080117 A1 Mar. 28, 2013

Related U.S. Application Data

(60) Provisional application No. 61/500,325, filed on Jun. 23, 2011.

(51) Int. Cl.
| | | |
|---|---|---|
| G06F 15/18 | (2006.01) | |
| G06F 17/10 | (2006.01) | |
| E21B 43/12 | (2006.01) | |
| E21B 44/00 | (2006.01) | |
| E21B 47/00 | (2012.01) | |

(52) U.S. Cl.
CPC ............. *G06F 17/10* (2013.01); *E21B 43/127* (2013.01); *E21B 44/00* (2013.01); *E21B 47/0008* (2013.01)

(58) Field of Classification Search
None
See application file for complete search history.

(56) References Cited

U.S. PATENT DOCUMENTS

| | | | | |
|---|---|---|---|---|
| 3,941,949 | A * | 3/1976 | Miller et al. | 379/17 |
| 5,643,212 | A * | 7/1997 | Coutre et al. | 604/131 |
| 5,823,262 | A * | 10/1998 | Dutton | 166/250.15 |
| 6,119,060 | A * | 9/2000 | Takayama et al. | 701/36 |
| 6,343,656 | B1 * | 2/2002 | Vazquez et al. | 166/373 |
| 6,393,101 | B1 * | 5/2002 | Barshefsky et al. | 379/9.04 |
| 6,396,904 | B1 * | 5/2002 | Lilley et al. | 379/9.04 |
| 6,408,953 | B1 * | 6/2002 | Goldman et al. | 175/39 |
| 6,853,921 | B2 * | 2/2005 | Thomas et al. | 702/14 |
| 7,711,486 | B2 * | 5/2010 | Thigpen et al. | 702/9 |
| 7,979,240 | B2 * | 7/2011 | Fielder | 702/185 |
| 8,201,424 | B2 * | 6/2012 | Bodden et al. | 70/34 |

(Continued)

OTHER PUBLICATIONS

Pouliezos et al., "Real Time Fault Monitoring of Industrial Processes", 1994, pp. 1-571.*

(Continued)

*Primary Examiner* — Jeffrey A Gaffin
*Assistant Examiner* — Paulinho E Smith
(74) *Attorney, Agent, or Firm* — Pillsbury Winthrop Shaw Pittman, LLP

(57) ABSTRACT

A computer-implemented artificial lift detection system, method, and software are provided for failure detection for artificial lift systems, such as sucker rod pump systems. The method includes providing artificial lift system data from an artificial lift system. Attributes are extracted from the artificial lift system data. Data mining techniques are applied to the attributes to determine whether the artificial lift system is detected to fail within a given time period. An alert is output indicative of impending artificial lift system failures.

20 Claims, 11 Drawing Sheets

(56) References Cited

U.S. PATENT DOCUMENTS

| | | | |
|---|---|---|---|
| 8,793,080 B1* | 7/2014 | Erlandsson et al. | 702/41 |
| 2002/0099505 A1* | 7/2002 | Thomas et al. | 702/12 |
| 2004/0133289 A1* | 7/2004 | Larsson et al. | 700/83 |
| 2004/0199362 A1* | 10/2004 | Cao et al. | 702/185 |
| 2005/0010311 A1* | 1/2005 | Barbazette et al. | 700/78 |
| 2005/0161260 A1* | 7/2005 | Koithan et al. | 175/57 |
| 2005/0172171 A1* | 8/2005 | Kadashevich | 714/38 |
| 2006/0040711 A1* | 2/2006 | Whistler | 455/566 |
| 2006/0149476 A1* | 7/2006 | Gibbs et al. | 702/6 |
| 2006/0291876 A1* | 12/2006 | Kawai et al. | 399/24 |
| 2007/0010998 A1* | 1/2007 | Radhakrishnan et al. | 704/211 |
| 2007/0121519 A1* | 5/2007 | Cuni et al. | 370/250 |
| 2007/0252717 A1* | 11/2007 | Fielder | 340/648 |
| 2008/0010020 A1* | 1/2008 | Ellender et al. | 702/6 |
| 2008/0100436 A1* | 5/2008 | Banting et al. | 340/539.22 |
| 2008/0126049 A1* | 5/2008 | Bailey et al. | 703/10 |
| 2008/0141072 A1* | 6/2008 | Kalgren et al. | 714/33 |
| 2008/0221714 A1* | 9/2008 | Schoettle | 700/90 |
| 2008/0262736 A1* | 10/2008 | Thigpen et al. | 702/9 |
| 2009/0311107 A1* | 12/2009 | Chavez Zapata | 417/12 |
| 2010/0111716 A1* | 5/2010 | Gibbs et al. | 417/63 |
| 2010/0125470 A1* | 5/2010 | Chisholm | 705/7 |
| 2010/0169446 A1* | 7/2010 | Linden et al. | 709/206 |
| 2011/0078516 A1* | 3/2011 | El-Kersh et al. | 714/48 |
| 2011/0139441 A1* | 6/2011 | Zolezzi Garreton | 166/249 |
| 2011/0178963 A1* | 7/2011 | Hartman et al. | 706/12 |
| 2011/0225111 A1* | 9/2011 | Ringer | 706/14 |
| 2011/0320168 A1* | 12/2011 | Lake et al. | 702/183 |
| 2012/0025997 A1* | 2/2012 | Liu et al. | 340/679 |
| 2012/0109243 A1* | 5/2012 | Hettrick et al. | 607/17 |
| 2012/0143565 A1* | 6/2012 | Graham et al. | 702/181 |
| 2012/0191633 A1* | 7/2012 | Liu et al. | 706/12 |
| 2013/0080117 A1* | 3/2013 | Liu et al. | 702/183 |
| 2013/0151156 A1* | 6/2013 | Noui-Mehidi et al. | 702/7 |
| 2013/0173165 A1* | 7/2013 | Balogun et al. | 702/6 |
| 2013/0173505 A1* | 7/2013 | Balogun et al. | 706/12 |
| 2013/0212443 A1* | 8/2013 | Ikegami | 714/57 |
| 2014/0278302 A1* | 9/2014 | Ziegel et al. | 703/2 |

OTHER PUBLICATIONS

Adam Rogal, "PreCog: A Robust Machine Learning System to Predict Failure in a Virtualized Environment", Nov. 18, 2008, MIT, pp. 1-59.*

Aminzadeh et al., "Reservoir Parameter Estimation using a Hybrid Neural Network", 2000, Computer & GeoSciences, vol. 26, pp. 869-847.*

* cited by examiner

| | AdaBNet Detection Algorithm $(T, D)$ |
|---|---|
| 1 | //Normalization process |
| 2 | For each well $T_i, T_i \in T$ |
| 3 | Choose the best attributes |
| 4 | For each selected attribute $a_{ij} \in T_i$ |
| 5 | Get median of the attribute $a_{ij}$ |
| 6 | Do the normalization for $a_{ij}$ |
| 7 | //Training the model |
| 8 | For each training well $Tr_i, Tr_i \in T$ |
| 9 | Time $t$ from 1 to $(length\_of\_T_i)$ |
| 10 | Training the Detection module with data at time $t$ |
| 11 | $H(x) = sign(\sum_{t=1}^{T} \alpha_t h_t(x))$ |
| 12 | //Testing the new well |
| 13 | For each testing well $Te_i, Te_i \in T$ |
| 14 | Time $t$ from 1 to $(length\_of\_T_i)$ |
| 15 | Testing the day record at time $t$ with trained detection module |
| 16 | Report the testing results showing the failure will happen within next $D$ days |

$T$: all the testing wells on a field;
$D$: failure will occur within next $D$ days from the detected days;

FIG. 6

SYSTEM AND METHOD FOR FAILURE DETECTION FOR ARTIFICIAL LIFT SYSTEMS

TECHNICAL FIELD

This invention relates to artificial lift system failures in oil field assets, and more particularly, to a system, method, and computer program product for failure detection for artificial lift systems.

BACKGROUND

Artificial lift techniques are widely used to enhance production for reservoirs with formation pressure too low to provide enough energy to directly lift fluids to the surface. Among various artificial lift techniques in the industry (such as Gas Lift, Hydraulic Pumping Units, Electric Submersible Pump, Progressive Cavity Pump, Plunger Lifts and Rod Pump techniques), the Sucker Rod Pump technique is the most commonly used artificial lift method. For example, rod pump systems currently constitute approximately 59% of all Artificial Lift in North America and 71% in the rest of the world. Furthermore, about 80% of United States oil wells are considered to be marginal or stripper wells, which produce an average of ten barrels per day or less over a twelve month period and primarily are produced using rod pump systems. In the United States, rod pump systems are currently used on about 350,000 wells.

There are many types of failures for rod pump systems including tubing failures, rod string failures and rod pump failures. The reasons for rod pump system failures can be broadly classified into two main categories: mechanical and chemical. Mechanical failures are caused by improper design, by improper manufacturing, or by wear and tear during operations. Well conditions such as sand intrusions, gas pounding, and asphalting can contribute to excessive wear and tear. Chemical failures are generally caused by the corrosive nature of the fluid being pumped through the systems. For example, the fluid may contain hydrogen sulfide ($H_2S$) or bacteria that excrete corrosive chemicals. Mechanical and chemical failures initially reduce the efficiency of pumping operations, but in due course will bring the systems to fail, thus requiring reactive well work. Wells are shut down to perform workovers, which results in production loss and an increase in the operating expenditure (OPEX) in addition to the regular maintenance cost.

Currently, pump off controllers (POCs) play a significant role in monitoring and controlling the operation of rod pump systems. For example, the POCs can be programmed to automatically shut down units if the values of torque and load deviate beyond a torque/load threshold. While POCs reduce the amount of work required by the production and maintenance personnel operating the field, they may not be sufficient since a great deal of time and effort is still needed to monitor each and every operating unit. The dynamometer card patterns collected by the POCs can be analyzed to better understand the behavior of the rod pump systems. However, successful analysis is directly linked to the skill and experience of the analyst and even the most knowledgable analysts can be misled into an incorrect diagnosis. In some cases, the dynamometer card may miss some early warnings of rod pump system failures. Furthermore, the well measurement dataset obtained by POCs often poses difficult challenges to data mining with respect to high dimensionality, noise, and inadequate labeling.

The data collected from POCs is inherently highly dimensional as POC controllers gather and record periodic well sensor measurements indicating production and well status through load cells, motor sensors, pressure transducers and relays. For example, in a dataset having 14 attributes where each attribute is measured daily, the dimension is 1400 for a dataset over a hundred day period.

Datasets for well measurement artificial lift also tend to be very noisy. The noise is produced from multiple sources, which include natural and manmade causes. The wells operate in rough physical environments which often results in equipment break down. For example, lightning strikes can sometimes disrupt wireless communication networks. Data collected by the POC sensors is therefore not received by a centralized logging database, which results in missing values in the data. Additionally, petroleum engineering field workers regularly perform maintenance and make calibration adjustments to the equipment. These maintenance activities and adjustments can cause the sensor measurements to change— sometimes considerably. For example, the POC sensors are occasionally recalibrated, which can introduce extreme changes in sensor readings. It is not standard practice to record such recalibrations. Furthermore, while workers are generally diligent with regards to logging their work in downtime and workover database tables, occasionally a log entry is delayed or not logged at all. Another source of data noise is the variation caused by the force drive mechanisms. In oil fields with insufficient formation pressure, injection wells can be used to inject fluid (e.g., water, steam, polymer, carbon dioxide) into the reservoir to drive hydrocarbons toward production wells. This fluid injection can also affect the POC sensors measurements.

The datasets received by POCs are also not explicitly labeled. Manually labeling the dataset received by a POC is generally too time consuming and very tedious. Furthermore, access to petroleum engineering subject matter experts (SMEs) to perform the manual labeling is also often limited. Fully automatic labeling is also problematic. Although the well failure events are recorded in the well database, they are not suitable for direct use because of semantic differences in the interpretation of well failure dates. In general, the well failure dates in the database do not correspond to the actual failure dates, or even to the dates when the SMEs first notice the failures. Rather, the recorded failure dates typically correspond to the date when the workers shut down the well to begin repairs. Because of the backlog of well repair jobs, the difference can be several months between the actual failure dates and the recorded failure dates. Moreover, even if the exact failure dates are known, differentiation of the failures among normal, pre-failure and failure signals still needs to be performed.

FIG. 1 shows an example of a past well failure where several selected attributes collected through a POC are displayed. As shown in FIG. 1, the well's failure was detected by field personnel on Mar. 31, 2010. After pulling all the pumping systems above the ground, they discovered that there were holes on the tubing that were causing the leaking problems, which in turn, reduced the fluid load the rod pump carried to the surface. Through a "look back" process, it was found that the actual leak started around Feb. 24, 2010. Even before that, a subject matter expert established that "rod cut" events likely started around Nov. 25, 2009, wherein the rod began cutting the tubing. After the initial cutting, the problem continually grew worse cutting larger holes into the tubing.

The inventors therefore have recognized a need for more automated systems, such as artificial intelligent systems that can dynamically keep track of certain parameters in a group of artificial lift systems, detect impending system failures and provide early indications or warnings thereof, and provide suggestions on types of maintenance work to address the detected failures including providing an optimal work schedule for performing such work. Such systems would be a great asset to industry personnel by potentially allowing them to be more proactive and to make better maintenance decisions. These systems could increase the efficiency of the artificial lift systems to bring down Operating Expenditure (OPEX), thereby making the artificial lift operations more economical.

BRIEF DESCRIPTION OF THE DRAWINGS

FIG. 6 shows an algorithm for detecting artificial lift system failures, according to an embodiment of the present invention.

DETAILED DESCRIPTION

Embodiments of the present invention relate to artificial lift system failures in oil field assets, which lead to production loss and can greatly increase operational expenditures. In particular, systems, methods, and computer program products are disclosed for analyzing and detecting the performance of artificial lift systems such as sucker rod pumps. For example, these units are developed using artificial intelligence (AI) and data mining techniques. Detecting artificial lift system failures can dramatically improve performance, such as by adjusting operating parameters to forestall failures or by scheduling maintenance to reduce unplanned repairs and minimize downtime.

As will be described in more detail herein, an automatic early failure detection framework and corresponding algorithms for artificial lift systems are disclosed. State-of-the-art data mining approaches are adapted to learn patterns of dynamical pre-failure and normal well time series records, which are used to make failure detections. Measured data from artificial lift systems can include many parameters such as card area, production, daily run time, stoke per minutes, and other parameters. For example, in one embodiment, more than 14 parameters of functioning of a sucker rod pump system are considered in data mining. Two classification based detection models are employed by combining two supervised learning algorithms. The models are calibrated to learn and easily recogonize any anomaly, failure, pre-failure, and normal pattern from archival historic pump operational data.

For convenience and simplicity, rod pumps are used to illustrate the early failure detection using the models. The results show that the failure detection framework is capable of capturing future rod pump and tubing failures using data from real-world assets using rod pump artificial lift systems. The models use measured data to learn and automatically detect possible failures in a large asset of thousands of wells with over 90% accuracy. Management of detected failures can be prioritized for production engineer for timely and suitable actions. The methods can enable engineers detect problems in the artificial lift operations before they happen from a remote operations control center. Based on detection results, a corresponding action plan can be implemented to minimize losses in production and re-entry cost. Field experts can not only remotely recognize the problem before any on-site action, but also save significant time and labor cost.

Figure 1:
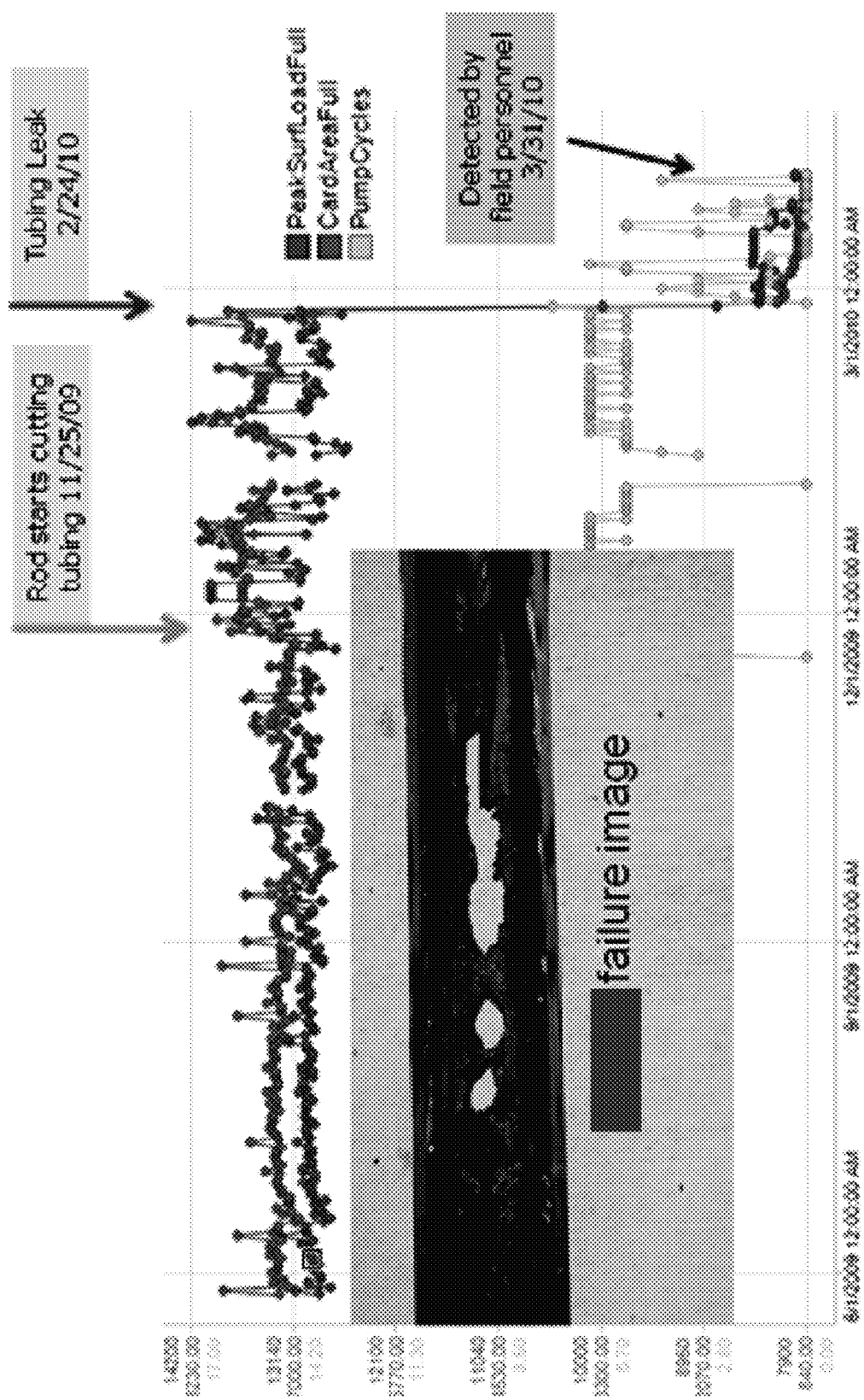
FIG. 1 shows an example well failure and failure pattern.
Figure 2A:
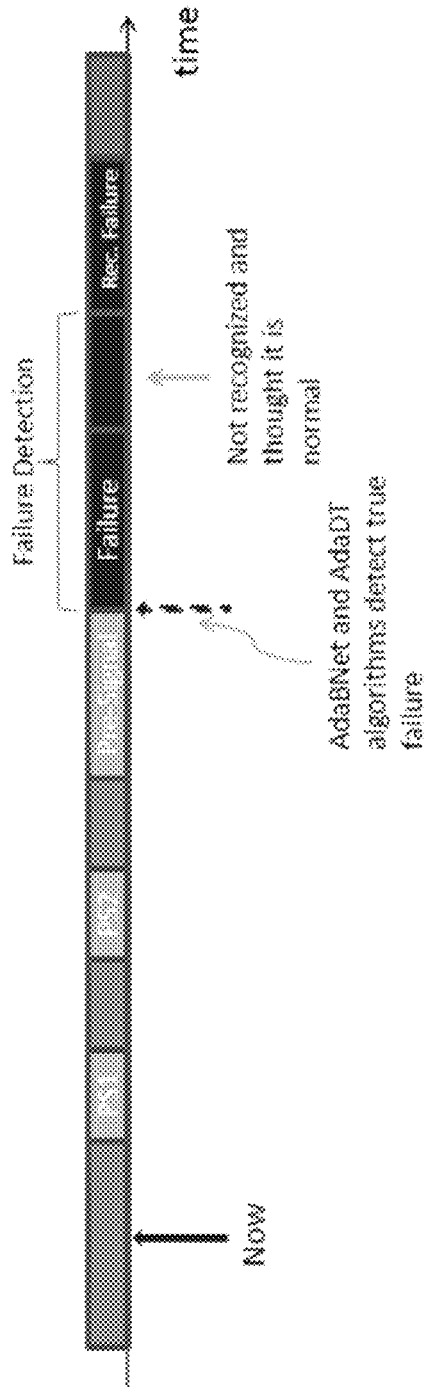
FIG. 2 shows early detection of true failures in the oilfield (2A) and early detection of pre-signals of true failures in the oilfield (2B), according to embodiments of the present invention.
Figure 2B:
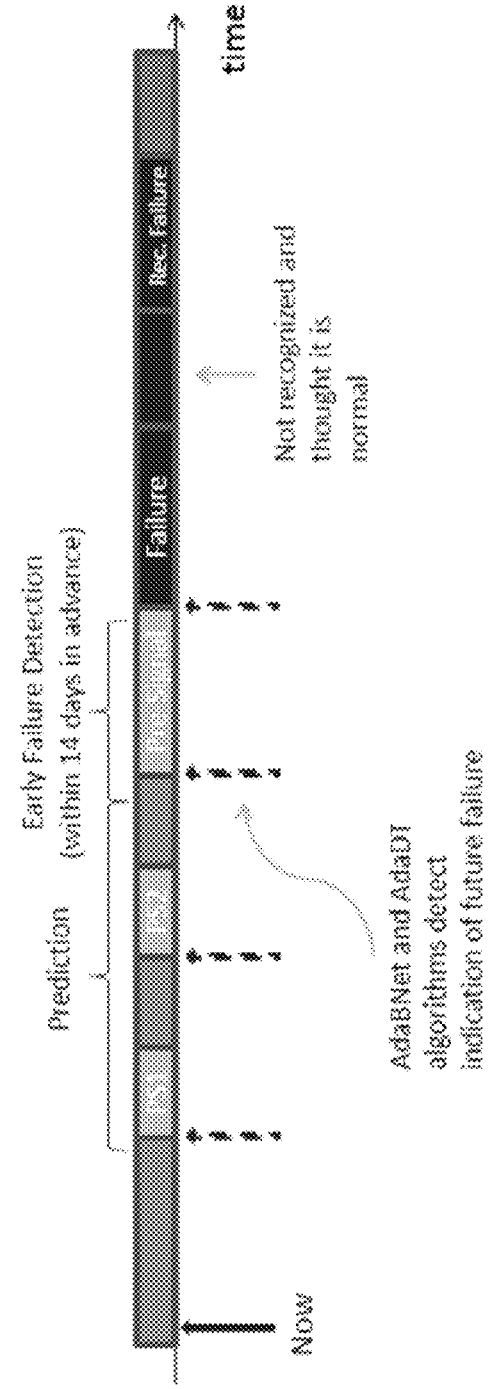

FIG. 2 shows that the constructed models are capable detecting the possible failures in the field, as well as, providing early detection of emerging failures. In particular, FIG. 2A shows early detection of true failures in the oilfield and FIG. 2B shows early detection of pre-signals of true failures in the oilfield. It is assumed that there are several pre-failure signals before failures happen (PS1, PS2 and Pre-failure Signal). Furthermore, there is usually a time lag between when a true hazard or failure occurs and when field engineers recognize the occurrence of failures, which is typically due to human delay. Recorded failures are shown in the timeline of FIG. 2 as "Rec. Failure". The models can accelerate early recognition of failures in the oilfield and at a much earlier time than what can be done by the engineers.

Figure 3:
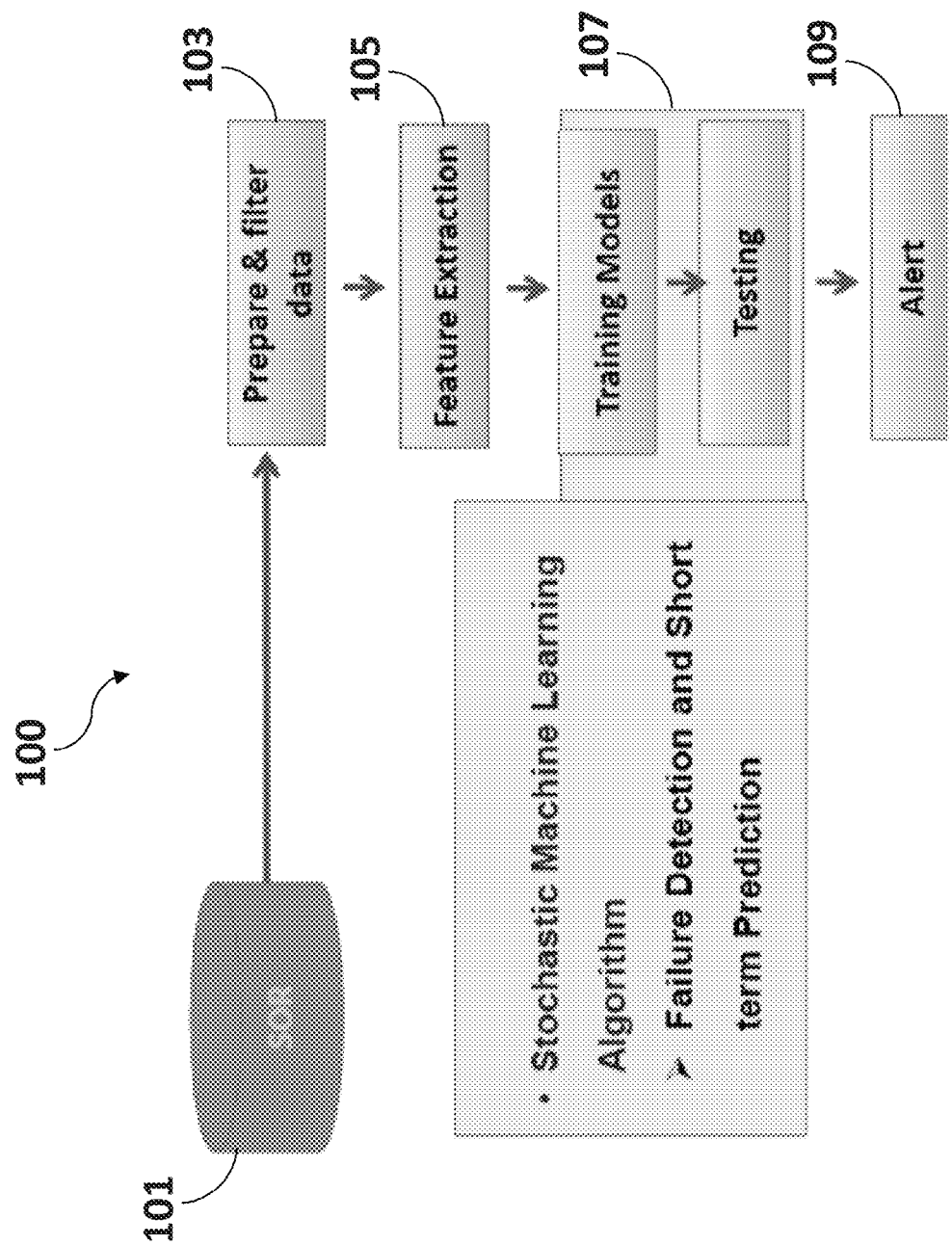
FIG. 3 is a flow diagram for detecting artificial lift system failures, according to an embodiment of the present invention.

FIG. 3 shows a workflow for detection of failures in artificial lift systems. The workflow in FIG. 3 can be divided into four main categories: Data Extraction (which is associated with Step 101), Data Preparation (which is associated with Step 103), Data Mining (which is associated with Steps 105, 107), and Outputs/Alerts (which is associated with Step 109). As will be described, Data Extraction comprises retrieving data from one or more databases or information storage system such as a System of Records (SOR), DataMart™, LOWIS™ (Life of Well Information Software), or Microsoft® Access. Data (e.g. workovers, beam analysis tables, etc) needed for failure detection can be extracted into tables, graphs, equations, or other usable format. Data Preparation typically includes preparing and filtering data. Data preparation can address the problem of noise and missing values. Data Mining includes transforming the raw data, which is extracted from a daily surveillance record, into features and training and testing of Artificial Intelligence (AI) Models to detect failures in the oilfield. For example, general supervised learning algorithms can be applied to train, test and evaluate results in Data Mining. The Outputs/Alerts stage is used to communicate detected failures to work personnel such as through a visualized interface.

Data Extraction

To perform failure detection, data is first collected for artificial lift systems of interest, such as sucker rod pumps. For example, data can be collected from pump off controllers (POCs), which gather and record periodic well sensor measurements indicating production and well status through load cells, motor sensors, pressure transducers and relays. Some attributes recorded by these sensors are card area, peak surface load, minimum surface load, strokes per minute, surface stroke length, flow line pressure, pump fillage, yesterday cycles, and daily run time, while calculated GB torque, polished rod HP, and net DH pump efficiency are calculated. These attributes are typically measured daily, sent over wireless network, and recorded in a database such as those available under the trade names of LOWIS™ (Life of Well Information Software) or DataMart™, which are both available from Weatherford International Ltd. Another example of a database or storage system (System of Records) is Microsoft® Access. In the database, attribute values can be indexed by a well identifier and a date. In addition to these daily measurements, field specialists can perform intermittent tests and enter the test results into the database. These attributes include last approved oil, last approved water, and fluid level. Since these attributes are generally not measured daily, the missing daily values can be automatically filled in with the previous measurement, i.e., these attribute values are assumed to be piecewise constants. Finally, a special attribute called "class" can be added that indicates the daily status of the well, i.e. either it is performing normally, is in pre-failure stage, or it has failed. All these attributes together define a labeled multivariate time series dataset for artificial lift systems.

The attributes can be partitioned into a plurality of attribute groups and ranked according to a metric that combines relevancy to failure predication and data quality. In one embodiment, the attribute groups are divided into three groups, which are labeled A, B and C with group A being the most relevant and having the highest data quality.

A. Card area, peak surface load, minimum surface load, yesterday cycles, daily run time
B. Strokes per minute, pump fillage, calculated GB torque, polished rod HP, net DH pump efficiency, gross fluid rate (sum of last approved oil and water), flow line pressure
C. Surface stroke length Software connectors are used to extract data in Step 101 from the artificial lift databases and feed it to the prediction system. For example, this can be achieved by running a SQL query on the database, such as LOWIS™ or the DataMart™, to extract the necessary attributes for each well in the form of time series.

Data Preparation

Raw artificial lift time series data typically contains noise and faults, which can be attributed to multiple factors. For example, severe weather conditions, such as lighting strikes, can disrupt communication causing data to be dropped. Transcription errors may occur if data is manually entered into the system. This noisy and faulty data can significantly degrade the performance of data mining algorithms. Data preparation is performed in Step 103 to reduce the noise as much as possible. An example of a noise reduction technique includes using the Grubbs's test to detect outliers and applying a locally weighted scatter plot smoothing algorithm to smooth the impact of the outliers. The denoised data is then transformed into features and all the time series data is transformed into a feature set.

Figure 4A:
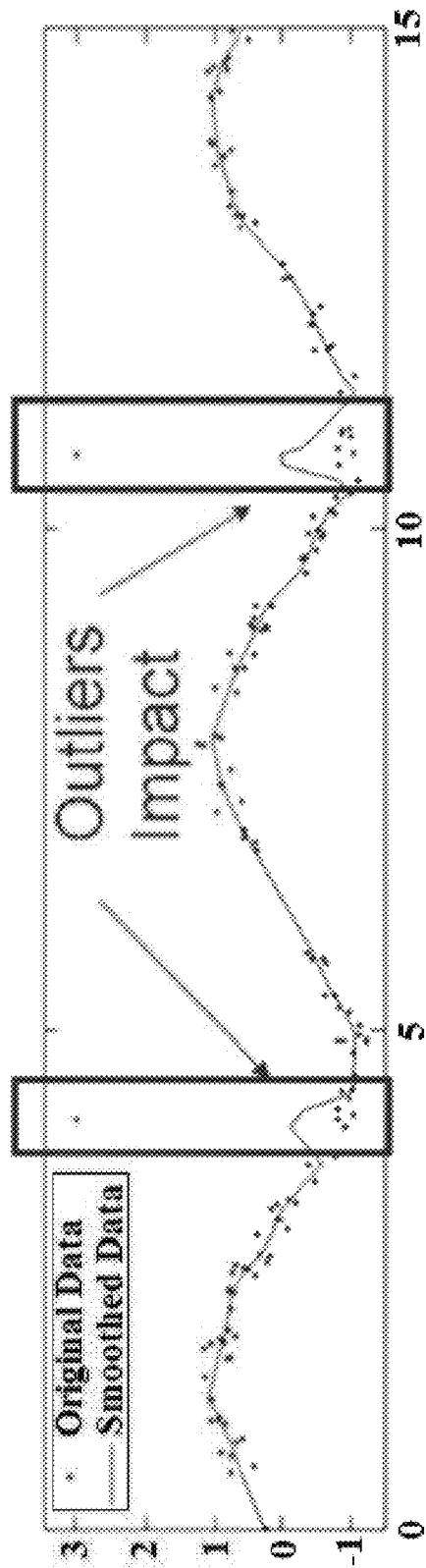
FIGS. 4A and 4B show the results of using data preparation techniques, according to an embodiment of the present invention.
Figure 4B:
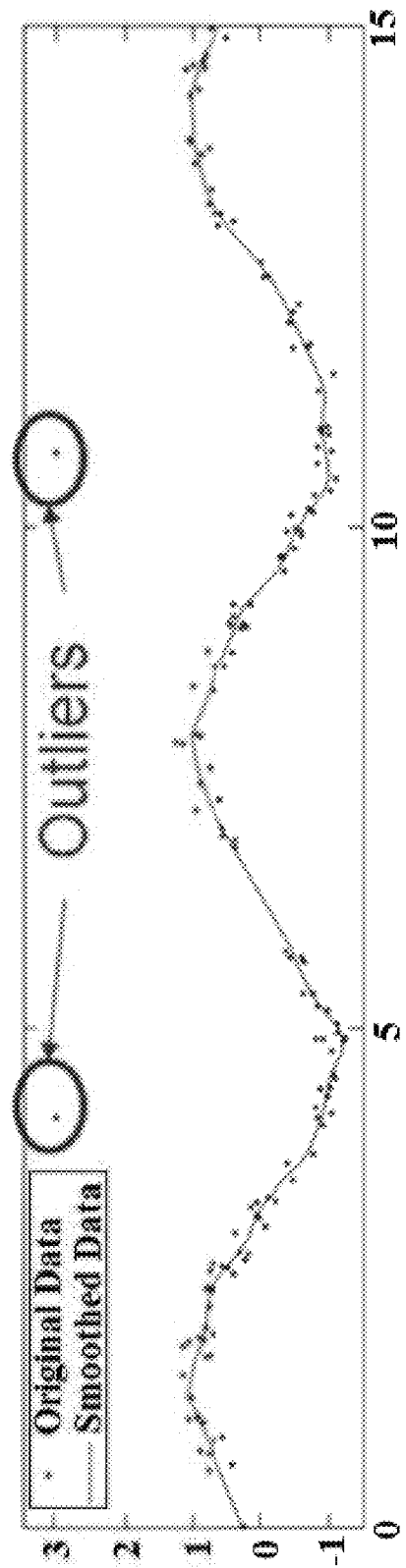

FIG. 4 shows the impact of outliers and the results for before (4A) and after (4B) the smoothing process using linear regression on artificial data points where random Gaussian noise and two outliers were added. The two outliers biased the curve by introducing two local peaks—which in fact do not exist. After the effects of the outliers were removed by using the smoothing process, the same regression algorithm is able to recover the original shape of the curve.

Data Mining

Each artificial lift system is characterized by multiple attributes, where each attribute by itself is a temporal sequence. This type of dataset is called a multivariate time series, where each multivariate time series refers to the data for a specific well. As used herein, a multivariate time series $T=t_1, t_2, \ldots, t_m$ comprises an ordered set of m variables. Each variable $t_i$ is a k-tuple, where each tuple $t_i=t_{i1}, t_{i2}, t_{i3}, \ldots, t_{ik}$ contains k real-values. The raw data, which is extracted from a daily surveillance record, is transformed into features in Step 105. For example, methods that can be used for feature extraction include those described by Li Wei and Eamonn Keogh at the 12th ACM SIGKDD international conference on knowledge discovery and data mining (Li Wei, Eamonn J. Keogh: Semi-supervised time series classification. KDD 2006: 748-753), which is herein incorporated by reference in its entirety.

The training dataset typically includes data from many artificial lift systems from the same field. In some embodiments, the training dataset contains data from artificial lift systems across multiple fields. All the wells are different in terms of rod pump system and well conditions. All of the well data is normalized in order to eliminate these differences. Normalization is based on the global median. As used herein, the percentage change is used instead of the absolute value, which is obtained by dividing the absolute value by the mean value. This pre-processing shows good results. Multi-dimensional scaling assisted labeling is used such that the multi-dimensional data is plotted into a 2D plot, and the difference between pre-failure, failure, and normal points can be visually determined.

Figure 5:
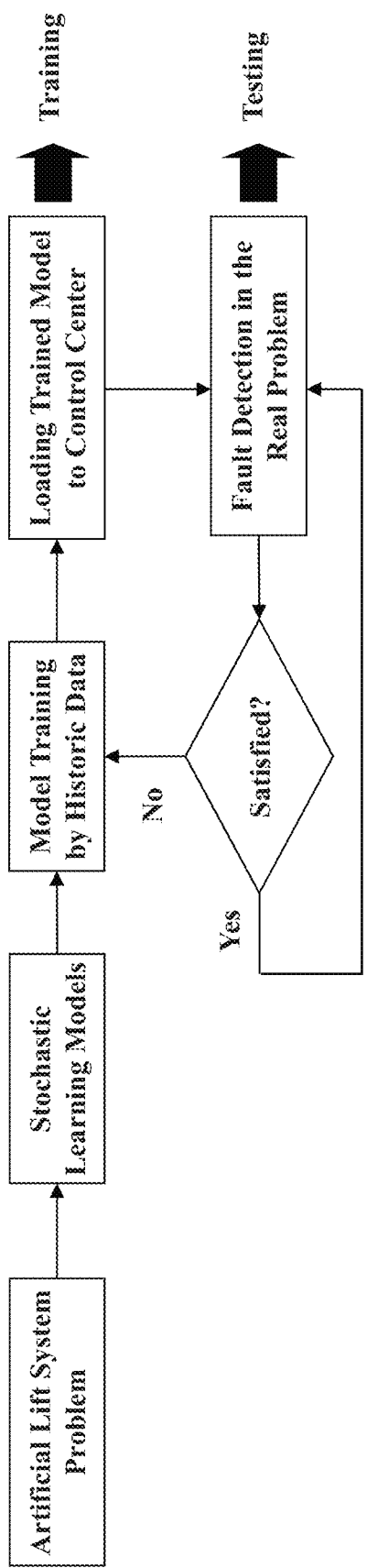
FIG. 5 is a flow diagram for training and testing a stochastic learning model, according to an embodiment of the present invention.

FIG. 5 shows a workflow for training and testing of Artificial Intelligence (AI) Models according to Step 107 in FIG. 3. For example, supervised learning algorithms can be applied to train, test and evaluate results in Data Mining. In supervised learning, the data mining algorithm is given positive and negative training examples of the concept the algorithm is supposed to learn. The formulation for this artificial lift domain is given an artificial lift multivariate time series with well class labels as the training dataset, which can be used to generate a failure detection model. When given previously unseen wells from a test dataset with their multivariate time series, but not the class values, the model can predict class values for that well. This learning problem is called supervised, because the class labels are used to direct the learning behavior of the data mining algorithm. In supervised learning, the resulting detection model does not change with respect to well data from the testing set.

Examples of supervised learning include AdaBoost Bayesian Network (AdaBNet) machine learning algorithms and AdaBoost Decision Tree (AdaDT) machine learning algorithms. FIG. 6 shows the AdaBNet algorithm. AdaBoost is an adaptive boosting algorithm. Unlike other algorithms that learn only one algorithm, AdaBoost is an algorithm for constructing a "strong" classifier as linear combination of "simple weak" classifiers $h_t(x)$.

$$f(x) = \sum_{t=1}^{T} \alpha_t h_t(x)$$

where $h_t(x)$ is weak or basis classifier, and $\alpha_t$ is the weight of this classifier at any given time, t.

The final output of AdaBoost is $H(x)=\text{sign}(f(x))$. AdaBoost utilizes the weighted training set. During learning of each basic classifier, $h_t(x)$, it increases weight of misclassified examples and decreases weight of correctly classified examples. AdaBoost is simple to implement and can achieve a very low training error.

AdaBoost can be viewed as optimizing the following exponential loss function, $$L_{exp}(x,y)=e^{-yf(x)}$$

If $$f(x) = \frac{1}{2}\sum_{t=1}^{T} \alpha_t h_t(x)$$

(the factor of ½ has no effect on the classifier output) is rewritten, then the full learning objective function is $$\min\left(\sum_i e^{-\frac{1}{2}y_i \sum_{t=1}^{T} \alpha_t h_t(x)}\right)$$

which is optimized with respect to the weights $\alpha_t$ and the parameters of the basic classifiers. Note that the exponential loss is an upper-bound on the 0-1 loss, $$L_{exp}(x,y) \geq L_{0-1}(x,y)$$

The basic classifiers are restricted as either Bayesian networks or decision trees, which are called AdaBNet and AdaDT algorithm, respectively. The optimal choice for $h_t(x)$ is the weak classifier that minimizes the weighted number of errors, $$h_t = \arg\min_h \sum_{i=1}^{N} D_t(i) I[y_i \neq h(x_i)]$$

where $D_t(i)$ is a distribution of weights over the training set, and N is the size of the training set. The minimum fraction of errors for that classifier is $$\epsilon_t = \sum_{i=1}^{N} D_t(i) I[y_i \neq h(x_i)]$$

Error Bound of AdaBNet and AdaDT

The training error of the AdaBoost algorithm is:

$$P_T(\text{error}) \leq \sum_{t=1}^{T} \left[2\sqrt{\epsilon_t(1-\epsilon_t)}\right]$$

If we let $$\epsilon_t = \frac{1}{2} - \gamma_t,$$

then $$P_T(\text{error}) \leq \prod_{t=1}^{T} \left[2\sqrt{\epsilon_t(1-\epsilon_t)}\right] =$$

$$\prod_{t=1}^{T} \sqrt{1-4\gamma_t^2} = \exp\left(-\sum_{t=1}^{T} KL(1/2 \| 1/2 - \gamma_t)\right) \leq \exp\left(-2\sum_{t=1}^{T} \gamma_t^2\right)$$

where $KL(a\|b) = a \ln(a/b) + (1-a)\ln((1-a)/(1-b))$ is the Kullback-Leibler divergence.

This means that the training error drops exponentially if each weak classifier is slightly better than random. Also, if the errors of all the classifiers are $$\epsilon_t = \frac{1}{2} - \gamma,$$

then $P_T(\text{error}) \leq \exp(-2T\gamma^2)$. That is to say, as the number of iterations goes towards infinity, the upper bound of the final classifier error approaches zero. Accordingly, AdaBoost can convert a weak learning algorithm into a strong learning algorithm, with arbitrarily low error rates.

Overfitting

Overfitting generally occurs when a model is excessively complex or too powerful in relation to the amount of data available. When a model is overfitted, it will lose accuracy during detection procedure. With the exponential loss and 0-1 loss, there is no overfitting for AdaBNet and AdaDT algorithms. Using the objective function to minimize $$E = \sum_i e^{-\frac{1}{2}y_i \sum_{t=1}^{T} \alpha_t h_t(x)}$$

Consider the weak classifier $f_t$ to be added at step t, then, $$E = \sum_i e^{-\frac{1}{2}y_i \sum_{j=1}^{t-1} \alpha_j h_j(x) - \frac{1}{2}y_i \alpha_t h_t(x)}$$

$$E = \sum_i D_t(i) e^{-\frac{1}{2}y_i \alpha_t h_t(x)}$$

$$E = \sum_{i:\, h_t(x_i)=y_i} D_t(i) e^{-\alpha_t/2} + \sum_{i:\, h_t(x_i) \neq y_i} D_t(i) e^{\alpha_t/2}$$

$$E = (e^{\alpha_t/2} - e^{-\alpha_t/2})\sum_i D_t(i) I(h_t(x_i) \neq y_i) + e^{-\alpha_t/2}\sum_i D_t(i)$$

where $$D_t(i) = e^{-\frac{1}{2}y_i \sum_{j=1}^{t-1} \alpha_j h_j(x)}.$$

The optimal value for $\alpha_t$ can be solved as, $$\frac{dE}{d\alpha_t} = \frac{1}{2}(e^{\alpha_t/2} + e^{-\alpha_t/2})\sum_i D_t(i) I(h_t(x_i) \neq y_i) - \frac{1}{2}e^{-\alpha_t/2}\sum_i D_t(i) = 0$$

The following weights are given as, $$0 = e^{\alpha_t/2}\epsilon_t + e^{-\alpha_t/2}\epsilon_t - e^{-\alpha_t/2}$$

$$e^{\alpha_t/2}\epsilon_t = e^{-\alpha_t/2}(1-\epsilon_t)$$

$$\frac{\alpha_t}{2} + \epsilon_t = -\frac{\alpha_t}{2}(1-\epsilon_t)$$

$$\epsilon_t = \ln\frac{1-\epsilon_t}{\epsilon_t}$$

This process shows that weights can be found for the algorithms in any situation and therefore, there is no overfitting in these algorithms.

Output/Alerts

All abnormal events are considered as failures, including true failures and downtimes. Therefore, in order to verify detection alerts, a look forward-backward process is used. Alerts, which are communicated to an operator or technician in Step 109, indicate that an artificial lift system is detected to fail. The alert can be utilized to minimize downtime of the well or for other reservoir management decisions.

EXAMPLES

The below examples focus on tubing failure and rod failure of sucker rod pump artificial lift systems to show the accuracy achieved using AdaBNet and AdaDT algorithms. Data is extracted and labelled as either normal or failure (i.e., rod failure, tubing failure, and pre-signals of the failures). This is used as training set to train the models. The trained models are then used to detect possible failures of rod pump systems. The tables below show confusion matrices of training results with 10-fold cross validation from both AdaBNet and AdaDT algorithms, which show how well the models could be trained. The rows are ground truth labels and the columns are classified labels by the models. The results show that the training errors for both algorithms are very low (less than 0.12%). The Confusion Matrix for AdaBNet, 10-fold cross validation (record level) is below:

|  | Normal | Tubing Failure | Rod Failure | Pre-Signal | Error Rate (%) |
| --- | --- | --- | --- | --- | --- |
| Normal | 2898 | 1 | 6 | 1 | 0.0027 |
| Tubing Failure | 2 | 18 | 0 | 0 | 0.10 |
| Rod Failure | 2 | 0 | 46 | 0 | 0.042 |
| StartToFail | 3 | 0 | 0 | 23 | 0.115 |

The Confusion Matrix for AdaDT, 10-fold cross validation (record level) is below:

|  | Normal | Tubing Failure | Rod Failure | Pre-Signal | Error Rate (%) |
| --- | --- | --- | --- | --- | --- |
| Normal | 2903 | 1 | 2 | 0 | 0.001 |
| Tubing Failure | 0 | 20 | 0 | 0 | 0 |
| Rod Failure | 0 | 0 | 48 | 0 | 0 |
| StartToFail | 2 | 0 | 0 | 24 | 0.076 |

The AdaBNet model was tested on 426 unknown wells (37 true failure wells and 389 true normal wells). As shown in the below table, the testing results indicate the high testing accuracy for both normal wells (97.7%) and failure wells (91.9%) with normalization.

|  | True Normal | True Failure |
| --- | --- | --- |
| Predicted Normal | 380 (97.7%) | 9 (2.3%) |
| Predicted Failure | 3 (8.1%) | 34 (91.9%) |

Figure 7:
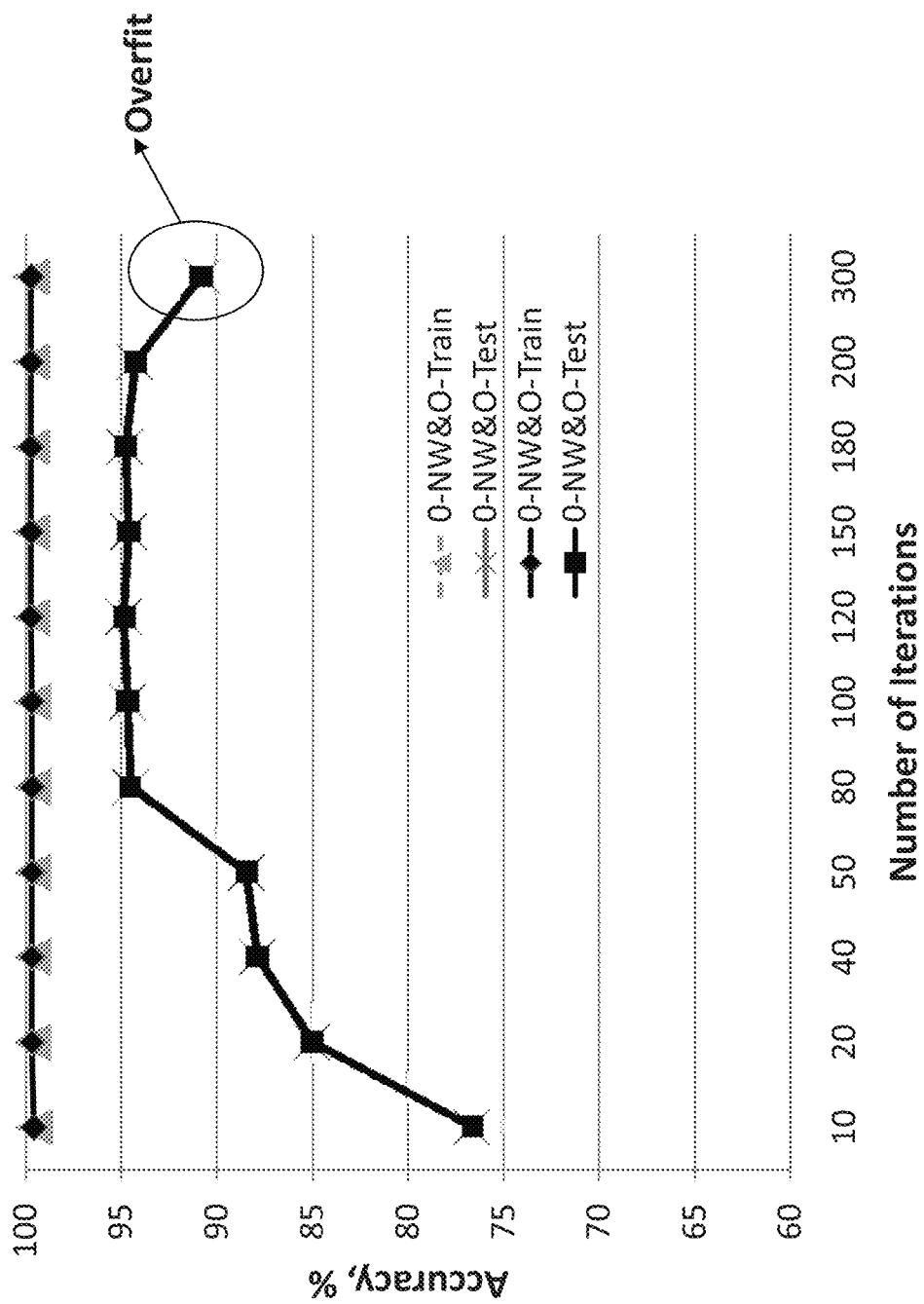
FIG. 7 shows training and testing results for detecting artificial lift system failures, according to an embodiment of the present invention.

FIG. 7 gives the testing results by AdaDT algorithm and shows the highest test accuracy of AdaDT when number of iteration is between 80 and 180, which is about 95%. When number of iteration is more than 180, the model shows overfitting with testing accuracy decreasing.

Figure 8:
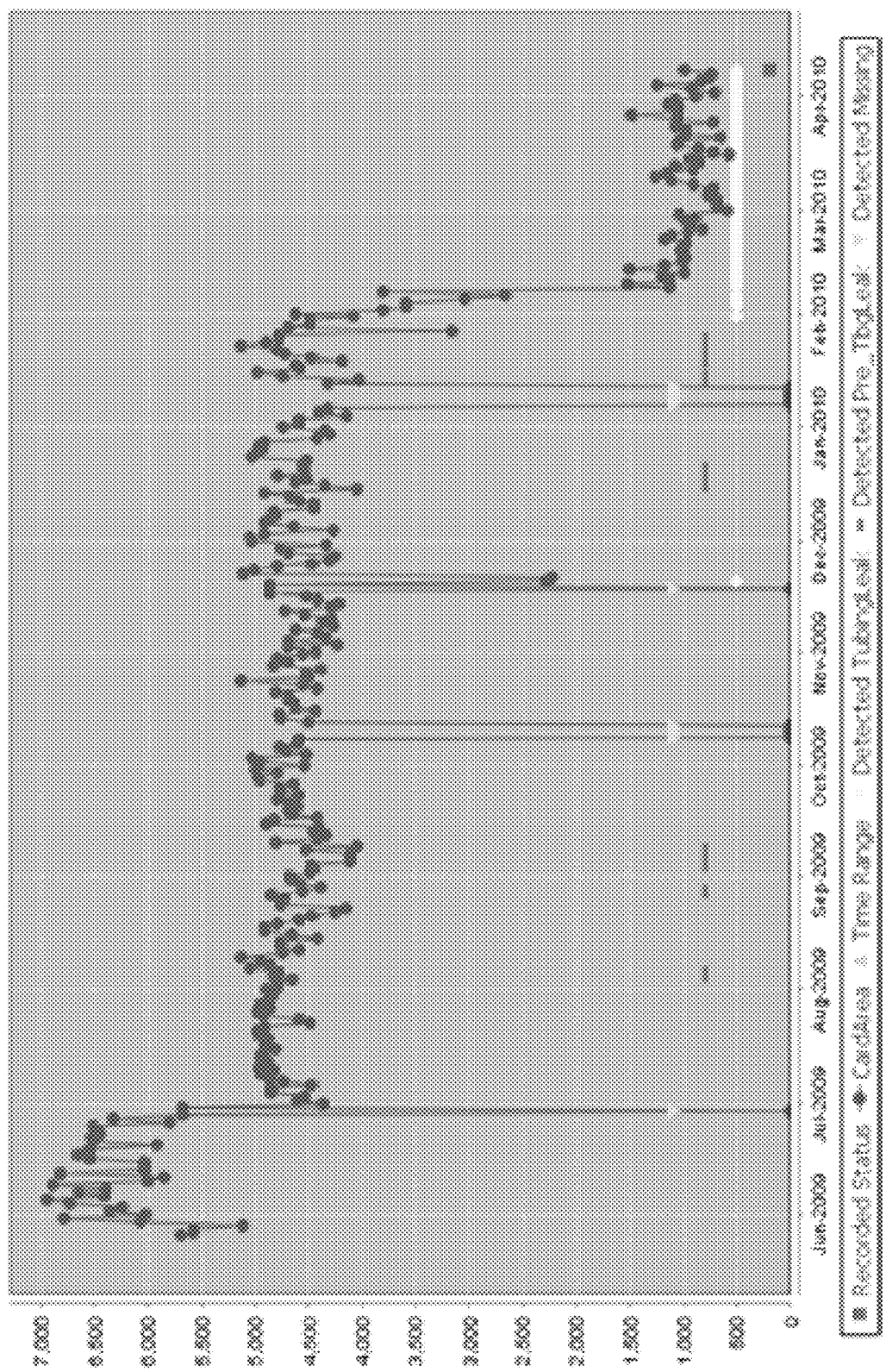
FIG. 8 shows pre-failure and failure signal testing results for an artificial lift system having a tubing failure, according to an embodiment of the present invention.

FIG. 8 shows pre-failure and failure signal testing results for an artificial lift system having a tubing failure. As shown in FIG. 8, the algorithm successfully detects the tubing failure about 2 months before the recorded failure date in the SOR, and pre-tubing failure about 8 months ahead of the recorded date in the SOR.

Figure 9:
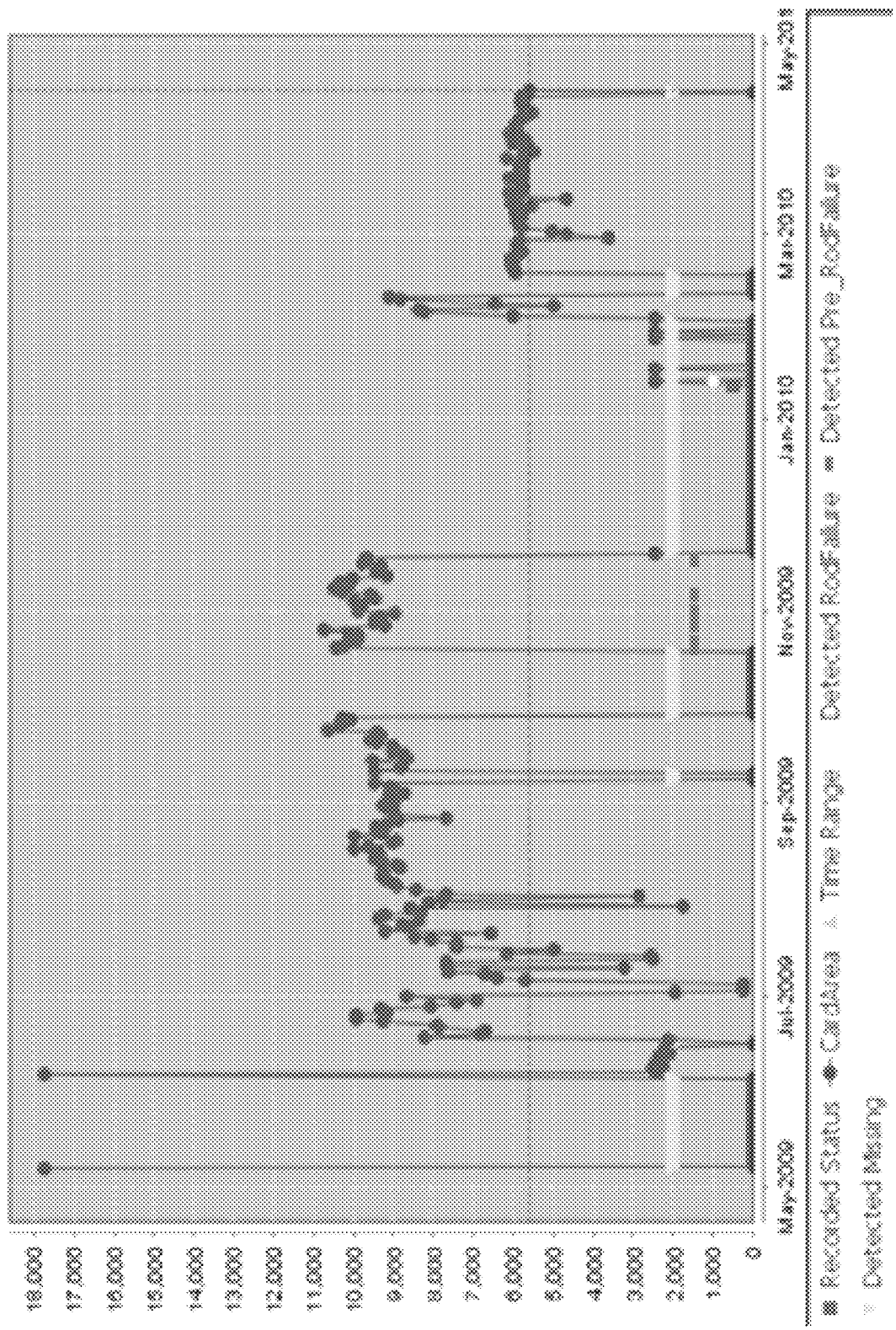
FIG. 9 shows pre-failure and failure signal testing results for an artificial lift system having a rod failure, according to an embodiment of the present invention.

FIG. 9 shows pre-failure and failure signal testing results for an artificial lift system having a rod failure. As shown in FIG. 9, the algorithms can detect the rod pump failures ahead of time.

In FIGS. 8 and 9, there is time delay between true failure date and recorded failure date because it will take some time for the field engineer to recognize and record the failure in the database. The algorithms can detect failures ahead of time which can save lots of cost and production for the operator. The detection algorithms also successfully detect all the missing data. Even though it is a trivial job for one to recognize missing records for a few wells, it is not easy when we are considering thousands of wells. The detection algorithms provide an automatic way to recognize the missing records and leave it to SME about how to interpret the meaning of the missing data, which may be due to maintenance, failure or other reasons.

Figure 10:
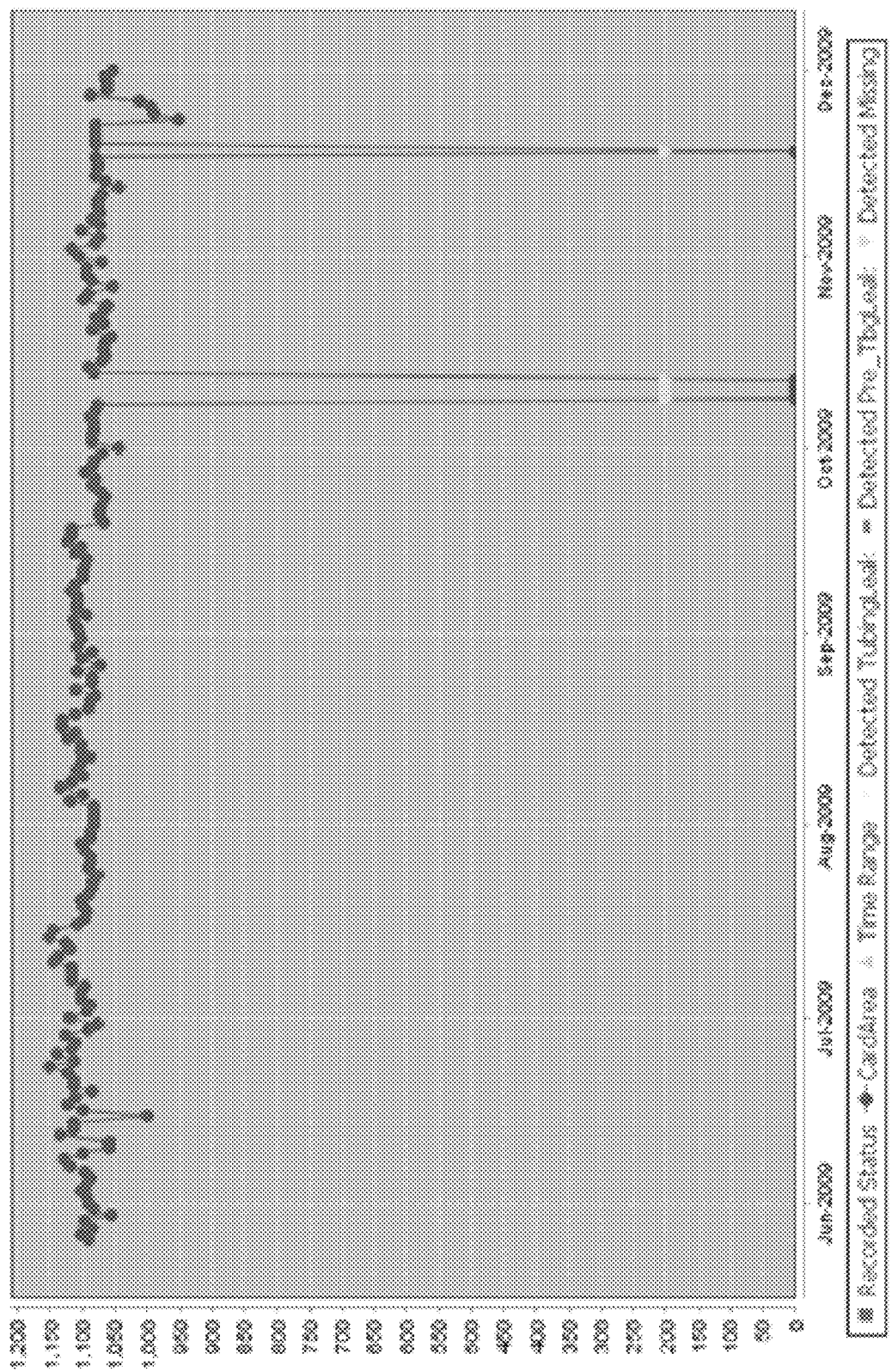
FIG. 10 shows pre-failure signal testing results for a normal artificial lift system, according to an embodiment of the present invention.

FIG. 10 shows pre-failure and failure signal testing results for a normal artificial lift system. The algorithms do not give false alarms on the selected well.

The data mining framework is able to automatically recognize early failure of artificial lift systems. Failure detection in rod pump wells use parameters that indicate the daily functions of rod pump wells and employ advanced machine learning techniques. In some embodiments, more than 14 parameters that indicate the daily functions of rod pump wells are utilized. The system recognizes failing, failed, and normal situations by learning patterns/signature from historical pump data, that include card area, peak-surface load, minimum-surface load, daily run-time, and production data. This data is automatically pre-processed using expert domain knowledge to reduce noise and to fill-in missing data. AdaBoost algorithms, such as AdaBNet and AdaDT, are used for learning and recognizing possible failures in oilfields.

The machine learning algorithm AdaBNet uses boosting to learn several Bayesian Network models and then combines these models with different weights to form a stronger boosted model. The approach generates this single boosted model that is applicable across all the wells in a field, as opposed to well-specific approaches that generate one model per well. This model detects anomalies, pre-failure and failure signals and generates corresponding alerts. Early fault detection in artificial lift systems, such as rod pump wells, is useful for automatic monitoring of large number of assets remotely. A training dataset of 12 wells is used to construct the learning model for the AdaBNet algorithm. The algorithm is tested on 426 wells from the same field. The testing results show that the suggested algorithms have high accuracy for early failure detection, which is more than 90% for the given data.

This framework can help field operators not only to remotely recognize and predict failures in advance, but also to help prioritize the available manpower, save significant time, reduce operating expense (OPEX), downtime and lost production. Early fault detection in rod pump systems can allow for proactive maintenance that can delay and even prevent future well failures. The proposed algorithm can enable production engineers remotely detect failures and anomalies before they occur, and assess the situation at control centers before taking any remedial or corrective actions. This approach to using a single model for an entire field is superior to other approaches that use an individual model for each well.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using a processor that comprises any one or a combination of computer processing system configurations, including, but not limited to, single and multi-processor systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory.

Figure 11:
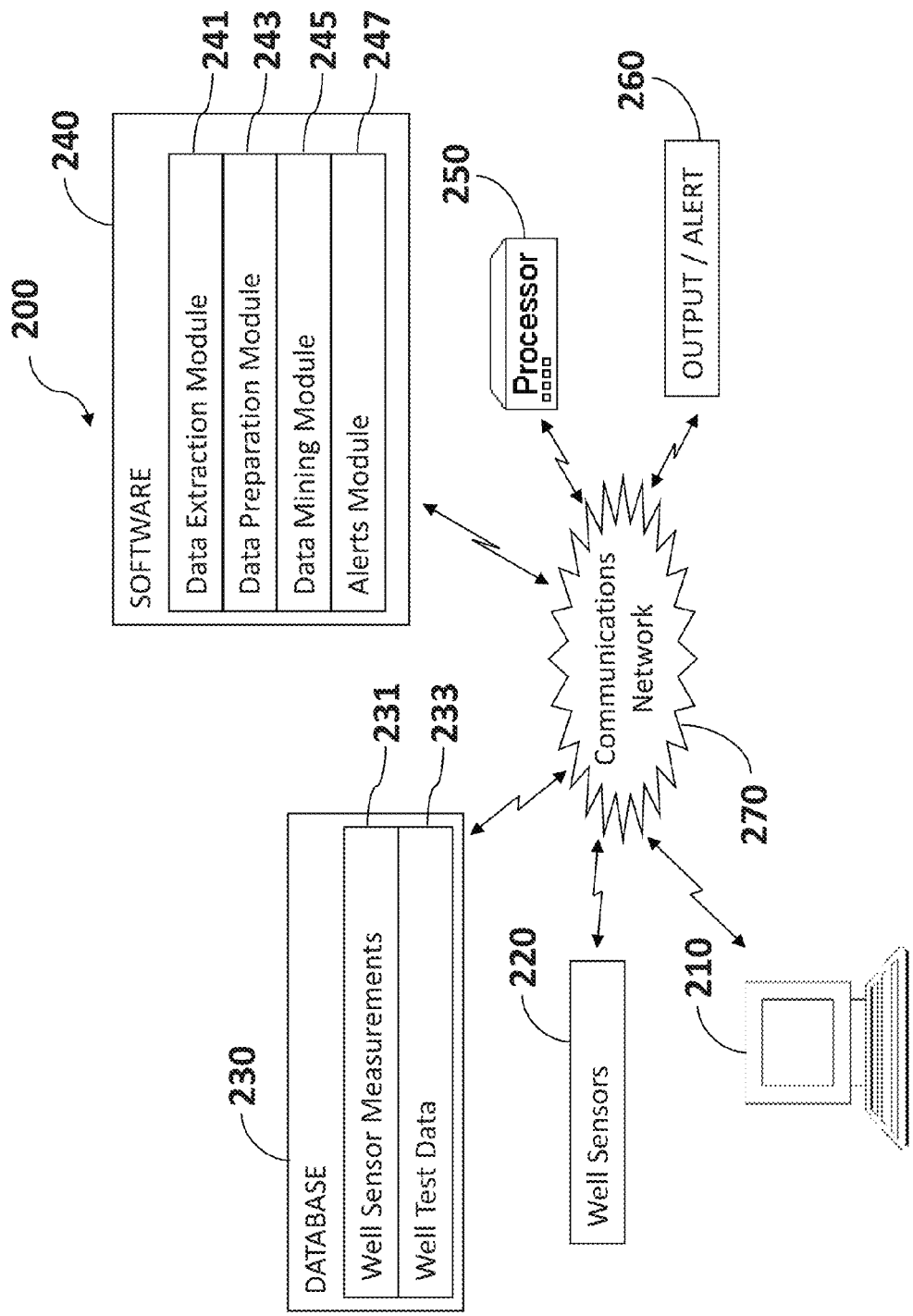
FIG. 11 shows a system for detecting failures in artificial lift systems, according to an embodiment of the present invention.

FIG. 11 illustrates a system 200 for analyzing and detecting failures for artificial lift systems such as on sucker rod pumps, such as by using method 100. System 200 includes user interface 210, such that an operator can actively input information and review operations of system 200. User interface 210 can be any means in which a person is capable of interacting with system 200 such as a keyboard, mouse, or touchscreen display. Operator-entered data input into system 200 through user interface 210, can be stored in database 230. Measured well data such as from POCs, which is received by one or more well sensors 220, can also be input into system 200 for storage in database 230. Additionally, any information generated by system 200 can be stored in database 230.

Database 230 can store, for example, well sensor measurements 231 indicating artificial lift information through load cells, motor sensors, pressure transducers and relays. Some attributes recorded by well sensors 220 are card area, peak surface load, minimum surface load, strokes per minute, surface stroke length, flow line pressure, pump fillage, yesterday cycles, and daily run time. Furthermore, GB torque, polished rod HP, and net DH pump efficiency can be calculated for storage in database 230. Well test data 233 can also be stored in database 230, which can include last approved oil, last approved water, and fluid level.

System 200 includes a computer program product or software 240 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, a fiber optic medium and/or other tangible media. As will be described more fully herein, software 240 can include a plurality of modules for performing system tasks such as performing the methods, such as method 100, previously described herein. Processor 250 interprets instructions to execute software 240, as well as, generates automatic instructions to execute software for system 200 responsive to predetermined conditions. Instructions from both user interface 210 and software 240 are processed by processor 250 for operation of system 200. In some embodiments, a plurality of processors can be utilized such that system operations can be executed more rapidly.

Examples of modules for software 240 include, but are not limited to, Data Extraction Module 241, Data Preparation Module 243, Data Mining Module 245, and Alerts Module 247. Data Extraction Module 241 is configured to retrieve artificial lift data from database 230, such as by using software connectors, and feed it to Data Preparation Module 243. Data Preparation Module 243 is configured to apply noise reduction techniques and fault techniques to the extracted data, as well as, fill in missing data. Data Mining Module 247 is configured to extract features from the processed data. Data Mining Module 247 is further configured to apply learning algorithms, such as supervised learning techniques, to train, test and evaluate the results in the data mining stage, thereby detecting failures for the artificial lift systems. Alerts Module 247 provide alerts that an artificial lift system is detected to fail.

In certain embodiments, system 200 can include reporting unit 260 to provide information to the operator or to other systems (not shown). For example, reporting unit 260 can receive alerts from Alerts Module 247 and output them to an operator or technician that an artificial lift system is detected to fail. The alert can be utilized to minimize downtime of the artificial lift system or for other reservoir management decisions. Reporting unit 260 can be a printer, display screen, or a data storage device. However, it should be understood that system 200 need not include reporting unit 260, and alternatively user interface 210 can be utilized for reporting information of system 200 to the operator.

Communication between any components of system 200, such as user interface 210, well sensors 220, database 230, software 240, processor 250 and reporting unit 260, can be transferred over a communications network 270. Communications network 270 can be any means that allows for information transfer. Examples of communications network 270 presently include, but are not limited to, a switch within a computer, a personal area network (PAN), a local area network (LAN), a wide area network (WAN), and a global area network (GAN). Communications network 270 can also include any hardware technology used to connect the individual devices in the network, such as an optical cable or wireless radio frequency.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

Nomeclature
AdaBNet: AdaBoost and Bayesian Network
AdaDT: AdaBoost and Decision Tree
SVM: Support Vector Machine PS1: Pre-Signal 1
PS2: Pre-Signal 2
Rec. Failure: Recorded Failure
POC: Pump Off Controller
GB: Gerar Box
HP: Horse Power
DH: Down Hole
$h_t(x)$: Weak or basis classifier
$\alpha_t$: Weight of classifier
H(x): Output classifier
$L_{exp}(x, y)$: Exponential loss function
$L_{0-1}(x, y)$: 0-1 loss function
$\epsilon_t$: Minimum fraction of errors
$D_t(i)$: Distribution of weights over the training set
$P_T(error)$: Training error
KL(a||b): Kullback-Leibler divergence
E: Objective function

We claim:

1. A method of monitoring a plurality of artificial lift systems in a hydrocarbon reservoir, the method being implemented on a computer system, the method comprising:
   monitoring a plurality of attributes of the plurality of artificial lift systems to collect a data set characterizing performance of the plurality of artificial lift systems, each one of the plurality of artificial lift systems having a plurality of attributes;
   applying dimensionality reduction techniques to the collected data set to project the collected data set into a reduced dimensional space;
   clustering the collected data set in the reduced dimensional space to generate a labeled training data set;
   wherein a portion of the collected data having the reduced dimension form clusters that contain known failures collected during a period of time are used to label another portion of collected data during another period of time from the same clusters as containing failures to generate the labeled training data set;
   applying a machine learning algorithm using the labeled training data set to boost learning and build a failure detection model for the plurality of artificial lift systems;
   applying the failure detection model to another collected data set from the plurality of artificial lift systems; and
   automatically generating an alert in response to identification of a data value in said another collected data set from the plurality of artificial lift systems indicating a fault in an artificial lift system in the plurality of artificial lift systems that generated the data value indicating the fault.

2. The method of claim 1, further comprising pre-processing the collected data prior to the applying the machine learning algorithm.

3. The method of claim 2, wherein the pre-processing comprises applying a noise-reducing algorithm to the collected data.

4. The method of claim 1, wherein the applying the machine learning algorithm comprises applying a Bayesian learning algorithm or a decision tree learning algorithm, or both.

5. The method of claim 1, wherein the monitoring comprises measuring attributes collected from pump off controllers of an array of sucker rod pumps located in the hydrocarbon reservoir.

6. The method of claim 1, further comprising partitioning into groups, the groups being ranked in accordance with a metric based on relevancy to failure prediction.

7. The method of claim 6, wherein the metric is further based on data quality.

8. The method of claim 1, wherein the applying the machine learning algorithm comprises:
   constructing a classifier as a linear combination of weak classifiers, and
   increasing weight of misclassified training examples and decreasing weight of correctly classified training examples.

9. The method of claim 1, wherein, when an alert is generated, a look forward-backward process is executed as a verification of the alert condition.

10. A system of monitoring a plurality of artificial lift systems in a hydrocarbon reservoir, comprising:
    a processor configured and arranged to receive a plurality of attributes characterizing performance of the plurality of artificial lift systems, each one of the plurality of artificial lift systems having a plurality of attributes;
    the processor being programmed with machine executable instructions for:
       applying dimensionality reduction techniques to the collected data set to project the collected data set into a reduced dimensional space;
       clustering the collected data set in the reduced dimensional space to generate a labeled training data set;
       wherein a portion of the collected data in the reduced dimensional space form clusters that contain known failures collected during a period of time are used to label another portion of collected data during another period of time from the same clusters as containing failures to generate the labeled training data set;
       applying a machine learning algorithm using the labeled training data set to boost learning and build a failure detection model for the plurality of artificial lift systems; and
       applying the failure detection model to another collected data set from the plurality of artificial lift systems; and
    the processor being further programmed with machine executable instructions for automatically generating an alert in response to identification of a data value in said another collected data set from the plurality of artificial lift systems indicating a fault in an artificial lift system in the plurality of artificial lift systems that generated the data value indicating the fault.

11. The system of claim 10, further comprising a plurality of detectors, configured and arranged to monitor the attributes of the artificial lift system, and in communication with a database for collecting the monitored attributes, the database being further in communication with the processor.

12. A non-transitory tangible machine readable medium comprising instructions for executing machine executable instructions for performing a method comprising:
    monitoring a plurality of attributes of a plurality of artificial lift systems to collect a data set characterizing performance of the artificial lift system, each one of the plurality of artificial lift systems having a plurality of attributes;
    applying dimensionality reduction techniques to the collected data set to project the collected data set into a reduced dimensional space;
    clustering the collected data set in the reduced dimensional space to generate a labeled training data set;
    wherein a portion of the collected data in the reduced dimensional space form clusters that contain known failures collected during a period of time are used to label another portion of collected data during another period of time from the same clusters as containing failures to generate the labeled training data set;

applying a machine learning algorithm using the labeled training data set to boost learning and build a failure detection model for the plurality of artificial lift systems;

applying the failure detection model to another collected data set from the plurality of artificial lift systems; and automatically generating an alert in response to identification of a data value in said another collected data set from the plurality of artificial lift systems indicating a fault in an artificial lift system in the plurality of artificial lift systems that generated the data value indicating the fault.

13. The system of claim 10, wherein the processor is further being programmed with machine executable instructions for pre-processing the collected data prior to the applying the machine learning algorithm.

14. The system of claim 13, wherein the pre-processing comprises applying a noise-reducing algorithm to the collected data.

15. The system of claim 10, wherein the applying the machine learning algorithm comprises applying a Bayesian learning algorithm or a decision tree learning algorithm, or both.

16. The system of claim 10, wherein the monitoring comprises measuring attributes collected from pump off controllers of an array of sucker rod pumps located in the hydrocarbon reservoir.

17. The system of claim 10, wherein the processor is further being programmed with machine executable instructions for partitioning into groups, the groups being ranked in accordance with a metric based on relevancy to failure prediction.

18. The system of claim 17, wherein the metric is further based on data quality.

19. The system of claim 10, wherein the applying the machine learning algorithm comprises:

constructing a classifier as a linear combination of weak classifiers, and increasing weight of misclassified training examples and decreasing weight of correctly classified training examples.

20. The system of claim 10, wherein, when an alert is generated, a look forward-backward process is executed as a verification of the alert condition.

* * * * *